United States Patent [19]
Poole et al.

[11] Patent Number: 5,615,338
[45] Date of Patent: Mar. 25, 1997

[54] SYSTEM FOR SIMULTANEOUSLY DISPLAYING VIDEO SIGNAL FROM SECOND VIDEO CHANNEL AND VIDEO SIGNAL GENERATED AT THAT SITE OR VIDEO SIGNAL RECEIVED FROM FIRST CHANNEL

[75] Inventors: Andrew D. Poole, Carlsbad; Gernot M. Engel, Del Mar, both of Calif.

[73] Assignee: Titan Information Systems Corporation, San Diego, Calif.

[21] Appl. No.: 449,727

[22] Filed: May 24, 1995

[51] Int. Cl.$^6$ ................................................ G06F 13/00
[52] U.S. Cl. .................... 395/200.04; 348/564; 348/571; 348/589; 348/58.4; 345/115; 364/242.96
[58] Field of Search ..................... 348/564, 571, 348/589, 584; 345/115; 395/200.01; 364/242.96

[56] References Cited

U.S. PATENT DOCUMENTS

| | | | |
|---|---|---|---|
| 3,485,953 | 12/1969 | Norberg | 178/50 |
| 4,535,448 | 8/1985 | Baxter et al. | 370/85.9 |
| 4,931,872 | 6/1990 | Stoddard et al. | 348/588 |
| 4,995,071 | 2/1991 | Weber et al. | 348/15 |
| 5,184,348 | 2/1993 | Abdelmouttalib et al. | 370/95.1 |
| 5,218,432 | 6/1993 | Wakeland | 348/590 |
| 5,285,284 | 2/1994 | Takashima et al. | 348/731 |
| 5,331,316 | 7/1994 | Mestdagh et al. | 340/825.03 |
| 5,365,264 | 11/1994 | Inoue et al. | 348/10 |
| 5,382,972 | 1/1995 | Kannes | 348/15 |

OTHER PUBLICATIONS

N.F. Huang, S.T. Sheu, "DTCAP—A Distributed Tunable Channel Access Protocol for Multi–Channel Photonic Dual Bus Networks", INFOCOM '95 1995.

*Primary Examiner*—Christopher B. Shin
*Assistant Examiner*—Anderson I. Chen
*Attorney, Agent, or Firm*—Edward W. Callan

[57] ABSTRACT

In a video conferencing system including stations at a plurality of different sites, and in which system first and second video channels are simultaneously displayed at each site station on a picture-in-picture video monitor, a site controller causes a video decoder at the site to decode either a video signal generated at the site or a video signal received from another site via the first video channel. The site controller also responds to a channel assignment signal generated by a system controller by assigning the first video channel to either a first predetermined broadcast frequency or to a second predetermined broadcast frequency and by assigning a second video channel carrying a video signal received from another site to the other of the first and second predetermined broadcast frequencies. The system controller processes channel allocation request signals from the different sites to generate the channel assignment signals for the plurality of sites in accordance with a predetermined priority among the various sites with respect to assignment of the first video channel and the second video channel.

10 Claims, 1 Drawing Sheet

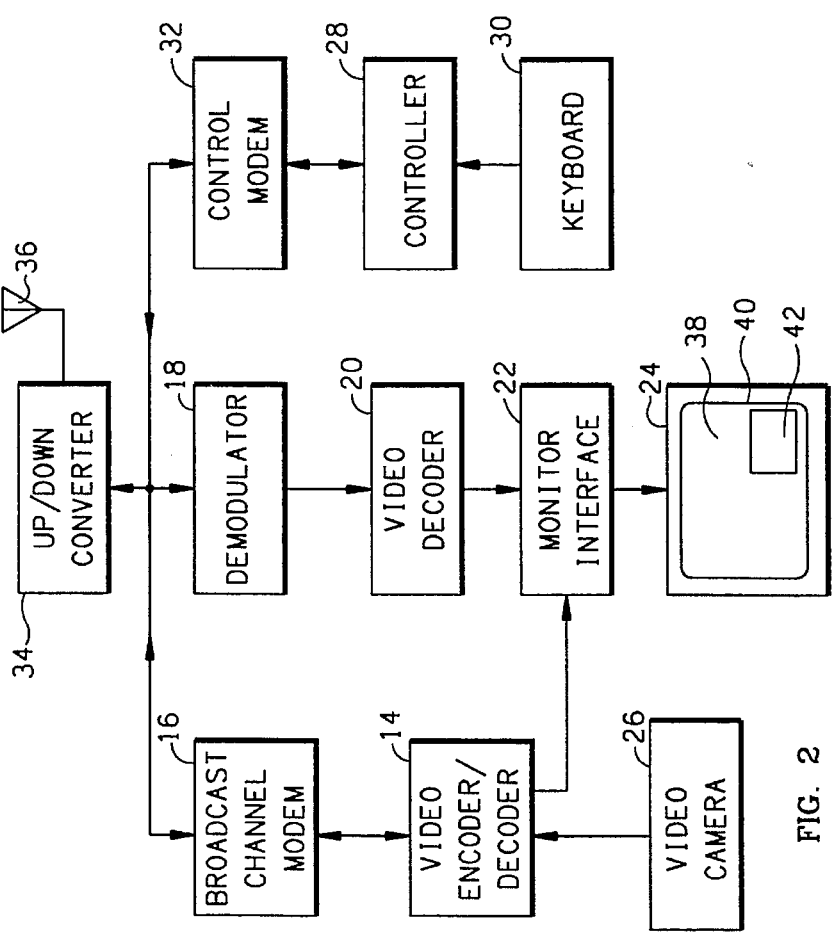

SYSTEM FOR SIMULTANEOUSLY DISPLAYING VIDEO SIGNAL FROM SECOND VIDEO CHANNEL AND VIDEO SIGNAL GENERATED AT THAT SITE OR VIDEO SIGNAL RECEIVED FROM FIRST CHANNEL

BACKGROUND OF THE INVENTION

The present invention pertains to video conferencing systems and methods and is particularly directed to simultaneously displaying at each of a plurality of sites video signals generated at a plurality of said sites.

In one prior art video conferencing system and method, video signals generated at a plurality of sites are transmitted to a central site, where the transmitted video signal having the highest priority for a primary display is combined with the transmitted video signal having the highest priority for a secondary display to provide a composite video signal for providing a simultaneous display of both the primary display and the secondary display, such as a picture-in-picture display, wherein the primary display occupies most of the screen of a video monitor and the secondary display occupies one corner of the primary display. One use for this system and method is to provide a primary display of a lecturer and a secondary display of a person questioning the lecturer. The choice of the site for the secondary display is based upon voice activation. This prior art system and method requires as many separate simplex video channels as there are sites in the system and there is an approximately 0.56 second round-trip delay for video signal transmission throughput.

SUMMARY OF THE INVENTION

The present invention provides a system for simultaneously displaying at each of a plurality of sites video signals generated at a plurality of said sites, comprising at each site: a video encoder for encoding a video signal generated at said site to provide an encoded video signal; a broadcast channel modem for conditioning the encoded video signal generated at said site for transmission to the other sites via a first video channel and for demodulating a video signal received via said one video channel; a demodulator for demodulating a video signal received via a second video channel; a first video decoder for decoding the demodulated video signal received via the second video channel; a second video decoder for decoding either the video signal generated at said site or the video signal received via the first video channel means coupled to the first and second video decoders for simultaneously displaying the decoded video signal received via the second video channel and either the decoded video signal generated at said site or the decoded video signal received via the first video channel; a site controller coupled to the second video decoder for causing the second video decoder to decode either the video signal generated at said site or the video signal received via the first video channel, and further coupled to the broadcast channel modem and the demodulator for responding to a channel assignment signal by assigning the first video channel to either a first predetermined broadcast frequency or to a second predetermined broadcast frequency and for assigning the second video channel to the other of said first and second predetermined broadcast frequencies; means for generating a channel allocation request signal for said site; and a site control modem for receiving the channel assignment signal to which the site controller is responsive and for conditioning the channel allocation request signal for transmission; wherein at one site, the system further comprises a system controller for processing the channel allocation request signals to generate the channel assignment signals for the plurality of sites in accordance with a predetermined priority among the various sites with respect to assignment of the first video channel and the second video channel; and a system control modem for demodulating channel allocation request signals received from the plurality of sites and for conditioning the channel assignment signals for transmission.

The video conferencing system and method of the present invention requires only a single half-duplex video channel and a single full duplex video channel and imposes only an approximately 0.28 second one-way-trip delay for video signal transmission throughput.

Additional features of the present invention are described with reference to the detailed description of the preferred embodiments.

BRIEF DESCRIPTION OF THE DRAWING

FIG. 1 is a block diagram of a preferred embodiment of a video conferencing system according to the present invention.

FIG. 2 is a block diagram of the central site station included in the video conferencing system of FIG. 1.

FIG. 3 is a table illustrating channel assignments for a plurality of site stations in the video conferencing system of FIG. 1.

DETAILED DESCRIPTION

Referring to FIG. 1, a preferred embodiment of a video conferencing system according to the present invention includes a central site stations 10 and a plurality of remote site stations 12a, 12b, 12c, . . . , 12n. Referring to FIG. 2, each site station 10, 12a, 12b, 12c, . . . , 12n includes a video encoder/decoder 14, a broadcast channel modem 16 coupled to the video encoder/decoder 14, a demodulator 18, a video decoder 20 coupled to the demodulator 18, a monitor interface circuit, 22 coupled to the video encoder/decoder 14 and the video decoder 20, a video monitor 24 coupled to the monitor interface circuit 22, a video camera 26 coupled to the video encoder/decoder 14, a controller 28, a keyboard 30 coupled to the controller 28, a control modem 32 coupled to the controller 28, an up/down convertor 34 coupled to the broadcast channel modem 16, the demodulator 18, and the control modem 32, and a transmit/receive antenna 36 coupled to the up/down convertor 38. The controller 28 is embodied in a microprocessor. In each of the remote site stations 12a, 12b, 12c, . . . 12n, the controller 28 functions as a site controller and the control modem 32 functions as a site control modem. In the central site station, the controller 28 functions as both a system controller and a site controller and the control modem 32 functions as a system control modem.

The video encoder/decoder 14 encodes a video signal generated at the same site by the video camera 26 to provide an encoded video signal.

The broadcast channel modem 16 conditions the encoded video signal for transmission to the other sites via a first video channel and provides the conditioned signal to the up/down converter 34. The up/down convertor 34 provides the conditioned signal to the antenna 36; and the antenna 36 transmits the conditioned signal to the other sites.

Signals received by the antenna 36 from the other sites via the first video channel are provided by the up/down convertor 34 to the broadcast channel modem 16, which demodulates the video signals received via the first video channel from the other sites.

Signals received by the antenna 36 from the other sites via a second video channel are provided by the up/down convertor 34 to the demodulator 18, which demodulates the video signals received via the second video channel.

The video decoder 20 decodes the demodulated video signal received via the second video channel and demodulated by the demodulator 18.

The video encoder/decoder 14 decodes either the video signal generated at the same site by the video camera 26 or the video signal received via the first video channel and demodulated by the broadcast channel modem 16.

The video monitor 24 is coupled to the video decoder 20 and the video encoder/decoder 14 by the monitor interface circuit 22 for simultaneously displaying the decoded video signal received via the second video channel and either the decoded video signal generated at the same site or the decoded video signal received via the first video channel from another site. The video signal in one of the two video channels is displayed as a primary display 38 occupying most of the screen 40 of the video monitor 24 and the video signal in the other of the two video channels is displayed as a secondary display 42 that occupies one corner of the primary display 38.

The controller 28 is coupled to the video encoder/decoder 14 for causing the video encoder/decoder 14 to decode either the video signal generated at the same site by the video camera 26 or the video signal received via the first video channel and demodulated by the broadcast channel modem 16. The controller 28 is also coupled to the broadcast channel modem 16 and the demodulator 18 for responding to a channel assignment signal by assigning the first video channel to either a first predetermined broadcast frequency or to a second predetermined broadcast frequency and for assigning the second video channel to the other of the first and second predetermined broadcast frequencies. The channel assignment signals are generated by the system controller 28 in the central site station 10, as discussed in more detail below.

The keyboard 30 is operated to generate a channel allocation request signal for the same site. Examples of channel allocation requests include requests that one or the other of the first and second channels be allocated for a video signal generated by a video camera 26 focused on a lecturer at the same site or a video signal generated by a video camera 26 focused on a questioner at the same site.

In each of the remote site stations 12a, 12b, 12c, ..., 12n, the control modem 32 receives the channel assignment signal to which the site controller 28 is responsive and conditions the channel allocation request signal for transmission. The control modem 32 is coupled to the up/down convertor 34 for effecting transmission and reception of the channel assignment signals and the channel allocations request signals by the antenna 36. The channel assignment signals and the channel allocations request signals are broadcast via a control channel, which occupies a blanking interval in one or the other of the first and second video channels.

In the central site station, the controller 28 also processes the channel allocation request signals to generate the channel assignment signals for the plurality of sites in accordance with a predetermined priority among the various sites with respect to assignment of the first video channel and the second channel. The priority data is entered into the controller 28 by operation of the keyboard 30.

Also in the central site station 10, the control modem 32 demodulates the channel allocation request signals received from the remote site stations 12a, 12b, 12c, ..., 12n and conditions the channel assignment signals for transmission from the central site station 10 to the remote site stations 12a, 12b, 12c, ..., 12n. Allocation request signals and channel assignment signals for the central site station 10 are generated and communicated internally within the controller 28 of the central site station 10.

The channel assignments are described with reference to the table of FIG. 3. For example, when among a plurality of different site stations 10, 12a, 12b, 12c, ..., 12n, a first site station 12a has the highest priority among those sites from which a channel allocation request signal for broadcast at the first predetermined broadcast frequency is received and a second site 12c has the highest priority among those sites from which a channel allocation request for broadcast at the second predetermined broadcast frequency is received, the system controller 28 in the central site station 10 generates channel assignment signals for causing the site controller 28 at the first site station 12a to cause the video signal generated at the first site station 12a to be decoded by the video encoder/decoder 14 and displayed at the first site station 12a, to cause the first video channel at the first site station 12a to be assigned to the first predetermined broadcast frequency and to cause the second video channel at the first site station 12a to be assigned to the second predetermined broadcast frequency; for causing the site controller 28 at the second site station 12c to cause the video signal generated at the second site station 12c to be decoded by the video encoder/decoder 14 and displayed at the second site station 12c, to cause the first video channel at the second site station 12c to be assigned to the second predetermined broadcast frequency and to cause the second video channel at the second site station 12c to be assigned to the first predetermined broadcast frequency; and for causing the site controllers at each of the other site stations 10, 12b, ..., 12n to cause the video signals generated at the first site station 12a and the second site station 12c to be displayed simultaneously at each of the other site stations 10, 12b ..., 12n. The channel assignment signals provided to each of the other site stations 10, 12b, ..., 12n causes the site controller 28 at each other site station 10, 12b, ..., 12n to cause the video signal received by the broadcast channel modem 16 to be decoded by the video encoder/decoder 14 and displayed at the other site station 10, 12b, ..., 12n, to cause the first video channel at the other site stations 10, 12b, ..., 12n to be assigned to the second predetermined broadcast frequency and to cause the second video channel at the other site stations 10, 12b, ..., 12n to be assigned to the first predetermined broadcast frequency. In the foregoing example, the highest priority for the first video channel is assigned to the site at which the principle speaker, (lecturer) is present.

In accordance with the foregoing example, when among the first site station 12a and the second site station 12c, the first site station 12a has the highest priority among those site stations from which a channel allocation request signal for a primary display is received and the second site station 12c has the highest priority among those site stations from which a channel allocation request for a secondary display is received, the system controller 28 in the central site station 10 generates channel assignment signals for causing the site controllers 28 to cause the video signal generated at the first site station 12a to be displayed as the primary display and the video signal generated at the second site station 12c to be displayed as the secondary display.

By adding additional cameras 26, video encoder/decoders 14, video decoders 20, monitor intrface units 22 and monitors 24 to one or more of the site stations 12a, 12b, 12c, . . . , 12n the number of persons that could concurrently question a lecturer can be increased.

While the above description contains many specificities, these should not be construed as limitations on the scope of the present invention, but rather as exemplifications of the preferred embodiments described herein. Other variations are possible and the scope of the present invention should be determined not by the embodiments described herein but rather by the claims and their legal equivalents.

We claim:

1. A system for simultaneously displaying at each of a plurality of sites video signals generated at a plurality of said sites, comprising at each site:

a video encoder for encoding a video signal generated at said site to provide an encoded video signal;

a broadcast channel modem for conditioning the encoded video signal generated at said site for transmission to the other sites via a first video channel and for demodulating a video signal received via said one video channel;

a demodulator for demodulating a video signal received via a second video channel;

a first video decoder for decoding the demodulated video signal received via the second video channel;

a second video decoder for decoding either the video signal generated at said site or the video signal received via the first video channel;

means coupled to the first and second video decoders for simultaneously displaying the decoded video signal received via the second video channel and either the decoded video signal generated at said site or the decoded video signal received via the first video channel;

a site controller coupled to the second video decoder for causing the second video decoder to decode either the video signal generated at said site or the video signal received via the first video channel, and further coupled to the broadcast channel modem and the demodulator for responding to a channel assignment signal by assigning the first video channel to either a first predetermined broadcast frequency or to a second predetermined broadcast frequency and for assigning the second video channel to the other of said first and second predetermined broadcast frequencies;

means for generating a channel allocation request signal for said site; and a site control modem for receiving the channel assignment signal to which the site controller is responsive and for conditioning the channel allocation request signal for transmission;

wherein at one site, the system further comprises a system controller for processing the channel allocation request signals to generate the channel assignment signals for the plurality of sites in accordance with a predetermined priority among the various sites with respect to assignment of the first video channel and the second video channel; and a system control modem for demodulating channel allocation request signals received from the plurality of sites and for conditioning the channel assignment signals for transmission.

2. A system according to claim 1, wherein when among three different sites a first site has the highest priority among those sites from which a channel allocation request signal for broadcast at the first predetermined broadcast frequency is received and a second site has the highest priority among those sites from which a channel allocation request for broadcast at the second predetermined broadcast frequency is received, the system controller generates channel assignment signals for causing the site controller at the first site to cause the video signal generated at the first site to be decoded by the second video decoder and displayed at the first site, to cause the first video channel at the first site to be assigned to the first predetermined broadcast frequency and to cause the second video channel at the first site to be assigned to the second predetermined broadcast frequency; for causing the site controller at the second site to cause the video signal generated at the second site to be decoded by the second video decoder and displayed at the second site, to cause the first video channel at the second site to be assigned to the second predetermined broadcast frequency and to cause the second video channel at the second site to be assigned to the first predetermined broadcast frequency; and for causing the site controller at the third site to cause the video signals generated at the first and second sites to be displayed simultaneously at the third site.

3. A system according to claim 2, wherein the display means include means for providing a primary display and a secondary display; and wherein when among two of the three different sites the first site has the highest priority among those sites from which a channel allocation request signal for a primary display is received and the second site has the highest priority among those sites from which a channel allocation request for a secondary display is received, the system controller generates channel assignment signals for causing the site controllers to cause the video signal generated at the first site to be displayed as the primary display and the video signal generated at the second site to be displayed as the secondary display.

4. A system according to claim 3, wherein the system controller generates channel assignment signals for causing the site controller at the third site to cause the first video channel at the third site to be assigned to the second predetermined broadcast frequency and to cause the second video channel at the third site to be assigned to the first predetermined broadcast frequency.

5. A system according to claim 1, wherein the display means include means for providing a primary display and a secondary display; and wherein when among two different sites a first site has the highest priority among those sites from which a channel allocation request signal for a primary display is received and a second site has the highest priority among those sites from which a channel allocation request for a secondary display is received, the system controller generates channel assignment signals for causing the site controllers to cause the video signal generated at the first site to be displayed as the primary display and the video signal generated at the second site to be displayed as the secondary display.

6. A method of simultaneously displaying at each of a plurality of sites video signals generated at a plurality of said sites, comprising at each site the steps of:

(a) encoding a video signal generated at said site to provide an encoded video signal;

(b) conditioning the encoded video signal generated at said site for transmission to the other sites via a first video channel;

(c) demodulating a video signal received via said one video channel;

(d) demodulating a video signal received via a second video channel;

(e) decoding the demodulated video signal received via the second video channel;

(f) decoding either the video signal generated at said site or the video signal received via the first video channel;

(g) simultaneously displaying the decoded video signal received via the second video channel and either the decoded video signal generated at said site or the decoded video signal received via the first video channel;

(h) causing the second video decoder to decode either the video signal generated at said site or the video signal received via the first video channel, and (i) responding to a channel assignment signal by assigning the first video channel to either a first predetermined broadcast frequency or to a second predetermined broadcast frequency and by assigning the second video channel to the other of said first and second predetermined broadcast frequencies;

(j) generating a channel allocation request signal for said site;

(k) receiving the channel assignment signal to which the site controller is responsive; and (l) conditioning the channel allocation request signal for transmission;

wherein at one site, the method further comprises the steps of:

(m) processing the channel allocation request signals to generate the channel assignment signals for the plurality of sites in accordance with a predetermined priority among the various sites with respect to assignment of the first video channel and the second video channel;

(n) demodulating channel allocation request signals received from the plurality of sites; and (o) conditioning the channel assignment signals for transmission.

7. A method according to claim 6, wherein when among three different sites a first site has the highest priority among those sites from which a channel allocation request signal for broadcast at the first predetermined broadcast frequency is received and a second site has the highest priority among those sites from which a channel allocation request for broadcast at the second predetermined broadcast frequency is received, step (m) comprises generating channel assignment signals for causing the video signal generated at the first site to be decoded and displayed at the first site, the first video channel at the first site to be assigned to the first predetermined broadcast frequency and the second video channel at the first site to be assigned to the second predetermined broadcast frequency; for causing the video signal generated at the second site to be decoded and displayed at the second site, the first video channel at the second site to be assigned to the second predetermined broadcast frequency and the second video channel at the second site to be assigned to the first predetermined broadcast frequency; and for causing the video signals generated at the first and second sites to be displayed simultaneously at the third site.

8. A method according to claim 7, wherein when among two of the three different sites the first site has the highest priority among those sites from which a channel allocation request signal for a primary display is received and the second site has the highest priority among those sites from which a channel allocation request for a secondary display is received, step (m) comprises generating channel assignment signals for causing the video signal generated at the first site to be displayed as the primary display and the video signal generated at the second site to be displayed as the secondary display.

9. A method according to claim 8, wherein step (m) further comprises generating channel assignment signals for causing the first video channel at the third site to be assigned to the second predetermined broadcast frequency and the second video channel at the third site to be assigned to the first predetermined broadcast frequency.

10. A method according to claim 6, wherein when among two different sites a first site has the highest priority among those sites from which a channel allocation request signal for a primary display is received and a second site has the highest priority among those sites from which a channel allocation request for a secondary display is received, step (m) comprises generating channel assignment signals for causing the video signal generated at the first site to be displayed as the primary display and the video signal generated at the second site to be displayed as the secondary display.

\* \* \* \* \*